United States Patent [19]

Ishida et al.

[11] Patent Number: 5,004,718
[45] Date of Patent: Apr. 2, 1991

[54] PROCESS FOR CALCINING A DENITRATING CATALYST

[75] Inventors: Nobuyoshi Ishida; Takashi Michimoto; Katsutaro Miyake; Toshio Ichige, all of Kure, Japan

[73] Assignee: Babcock-Hitachi Kabushiko Kaisha, Tokyo, Japan

[21] Appl. No.: 396,472

[22] Filed: Aug. 21, 1989

Related U.S. Application Data

[63] Continuation-in-part of Ser. No. 134,367, Dec. 17, 1987, abandoned.

[51] Int. Cl.⁵ .................. B01J 27/053; B01J 8/00
[52] U.S. Cl. .................. 502/217; 423/239; 432/25; 502/48; 502/517; 502/527
[58] Field of Search ............. 502/48, 217, 242, 517; 432/8, 11, 12, 18, 25; 266/178, 251, 252

[56] References Cited

U.S. PATENT DOCUMENTS 2,723,949 11/1955 McCausland ................ 208/176
4,085,193 4/1978 Nakajima et al. ............ 502/242
4,119,568 10/1978 Nishida et al. ............... 502/217
4,567,630 2/1986 Ishida et al. .................. 427/425
4,582,301 4/1986 Wünning ..................... 266/252

FOREIGN PATENT DOCUMENTS 7416823 7/1979 Netherlands .................. 502/48

Primary Examiner—Paul E. Konopka
Attorney, Agent, or Firm—Fay, Sharpe, Beall, Fagan, Minnich & McKee

[57] ABSTRACT

A process for calcining a sulfate-containing denitrating catalyst to reduce the sulfate content therein is provided. A plurality of catalyst units are arranged on a reticulating belt in a calcining furnace. The reticulate belt is continuously moving within the furnace. Fresh hot air is passed through the denitrating catalyst units in a first direction and then in a second direction. By controlling the rate of hot air flow, the content of sulfate group in the denitrating catalyst is reduced to about 4-7% by weight.

11 Claims, 3 Drawing Sheets

PROCESS FOR CALCINING A DENITRATING CATALYST

This application is a continuation-in-part of application Ser. No. 134,367, filed Dec. 17, 1987, now abandoned.

BACKGROUND OF THE INVENTION

1. Field of the Invention

This invention relates to a process for calcining a denitrating catalyst. More particularly, it relates to a process for calcining a denitrating catalyst to obtain a denitrating catalyst which provides a uniform performance.

2. Description of the Related Art

Heretofore, catalysts composed mainly of oxides of metals such as titanium, vanadium, molybdenum, etc. have been used in connection with exhaust gas-denitration. During exhaust gas denitration, nitrogen oxides contained in exhaust gases are reduced with ammonia. These metal oxide catalysts are molded products having low strength. Thus, a process to form a plate catalyst has been developed and is set forth in U.S. Pat. No. 4,567,630. In that process, a catalytic substance is applied onto both the surfaces of a core porous plate support to form a plate catalyst.

In one example of porous plate catalyst preparation, a raw material slurry of a catalytic substance is heat-kneaded, followed by extrusion-granulation, drying, precalcination, milling, thereafter adding water and a filler, kneading the mixture in a pasty state, applying the resulting material onto a plate expanded metal, contact-bonding these, processing the resulting material into a plate shape having Z-form projections in the cross-section, cutting and air-drying. The resulting plate catalyst elements are calcined, and then impregnated with another catalytic component, if necessary. They are then stacked within a frame body to form a catalyst unit. This catalyst unit is then subjected to final calcination to form a product.

The calcining furnace used for the above-mentioned calcination is a so-called hot air circulating furnace. In the past, it has been know to circulate hot air in only one direction through the catalyst units arranged on a track within the furnace.

The furnace however, has raised problems in that the performance of the product obtained after the calcination is not constant. In particular, the catalyst on the inlet side of the hot air furnace and that on the exit side thereof are of inferior quality. They make it undesirable to use such catalyst. Furthermore, not only does the available volume of the hot air furnace become reduced, but the amount of energy loss increases, and an extended calcination time is required.

SUMMARY OF THE INVENTION

The object of the present invention is to provide a process for calcining a denitrating catalyst, wherein such process is capable of producing a uniform catalyst having good percentage denitration and mechanical properties. The process calls for calcining a catalyst unit in a hot air furnace uniformly, regardless of the location of the unit within the furnace. The catalyst unit is obtained by stacking catalyst plates within a frame body.

The present invention resides in a process for calcining a sulfate-containing denitrating catalyst in order to reduce the sulfate content therein. The process calls for a plurality of catalyst units to be arranged on a reticulate belt which is continuously moving within a calcining furnace. Fresh hot air is passed through the denitrating catalyst units in a first direction, with the air flow direction then being reversed to pass fresh hot air through the catalyst units in a second direction. The rate of hot air flow is controlled so that the content of sulfate group in the catalyst units is reduced.

DETAILED DESCRIPTION OF PREFERRED EMBODIMENTS

Figure 1:
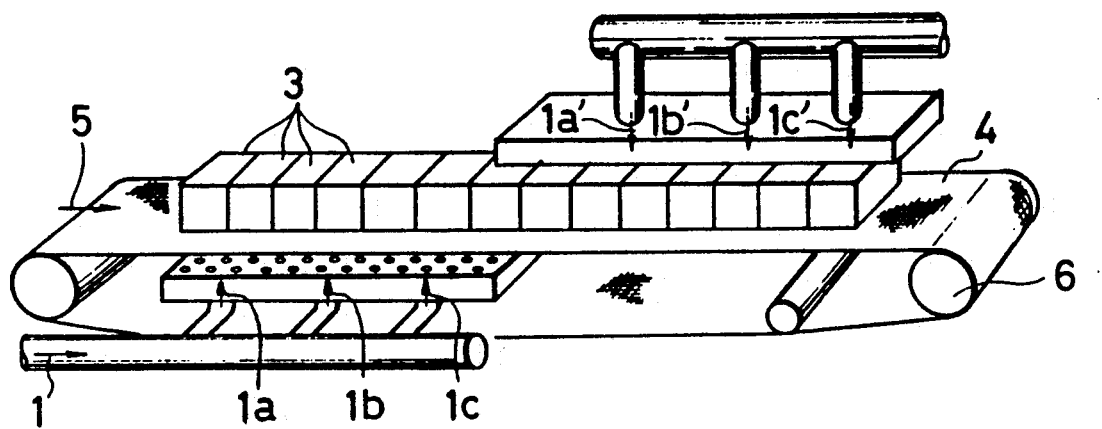
FIG. 1 shows an oblique view illustrating an embodiment of the catalyst-calcining furnace employed in the process of the present invention.

The present inventors have investigated the reasons why calcination cannot be uniformly carried out when a conventional hot air circulating calcining furnace is used. As a result, it has been found that sulfate group remaining in the catalyst has a large influence upon the quality of the catalyst. The catalysts are prepared by drying and calcining pastes or slurries which are applied to substrates such as porous plates. The pastes are formed by mixing or partially dissolving oxides of metals such as titanium, vanadium, molybdenum and tungsten in a sulfuric acid solution to form a slurry. Hence, sulfuric acid is present in the resulting catalyst slurry. The amount of sulfate group remaining influences the percentage of denitration as well as the mechanical properties, such as abrasion resistance, of the catalyst. It is desirable to control the amount of sulfate group in the catalyst finally obtained.

For example, the following slurry was formed:

| | |
|---|---|
| $TiO_2$ | 30% |
| $H_2SO_4$ | 10% |
| $H_2O$ | 60% |

Other metals including vanadium, molybdenum, tungsten or additional titanium can be added to the slurry, with the particular metal and the relative proportions thereof depending on the objective of the catalyst composition. Alumina, silicate, or other similar materials can be added to the mixture as a filler to form a paste. By the time the other materials are added, the relative weight percent of the sulfate is greater than or in excess of 7% by weight. The present invention is directed to controlling the proportion of the remaining sulfate content which is to be reduced to approximately 4–7% in the final catalyst, preferably 5–6%, through a drying and calcination process.

There are at least two types of catalysts which are formed in accordance with the present invention. For example, compounds, included in a first type of catalyst include $TiO_2$, $MoO_3$, $V_2O_5$, $Al_2(SO_4)_3$, $Al_2O_3 \cdot SiO_2$ and others. The ratio of Ti:Mo:V is about 100:22:1.2, with the sulfate group content present in a range between 4% and 7%.

A second type of catalyst includes the following compounds: $TiO_2$, $V_2O_5$, tungsten oxide and others. The relative ratios of Ti:W:V are 100:3.1:0.5. The sulfate group in the final catalyst product in this second type of catalyst is also between approximately 4% and 7%.

In preparing both types of catalysts, $TiO_2$ slurry containing 10% by weight of $H_2SO_4$, which is commercially available, is used as a raw material of a main component $TiO_2$. The proportions of the metals set out above are only relative proportions of each catalytic metal component.

The sulfate group is present in the catalyst in two forms. First, it is present in the form of a metal sulfate. Second, it is present in the form of a radical which is adsorbed on a metal oxide such as $TiO_2$. The sulfate group can be detected by a number of means, one example being a fluoro-X-ray analysis. It is desirable to calcine the catalyst so that the final catalyst includes sulfate in the range of about 4-7% by weight. Such a sulfate range is desirable because the resulting catalyst has a high resistance to abrasion and a high performance in the percentage denitration.

Figure 7:
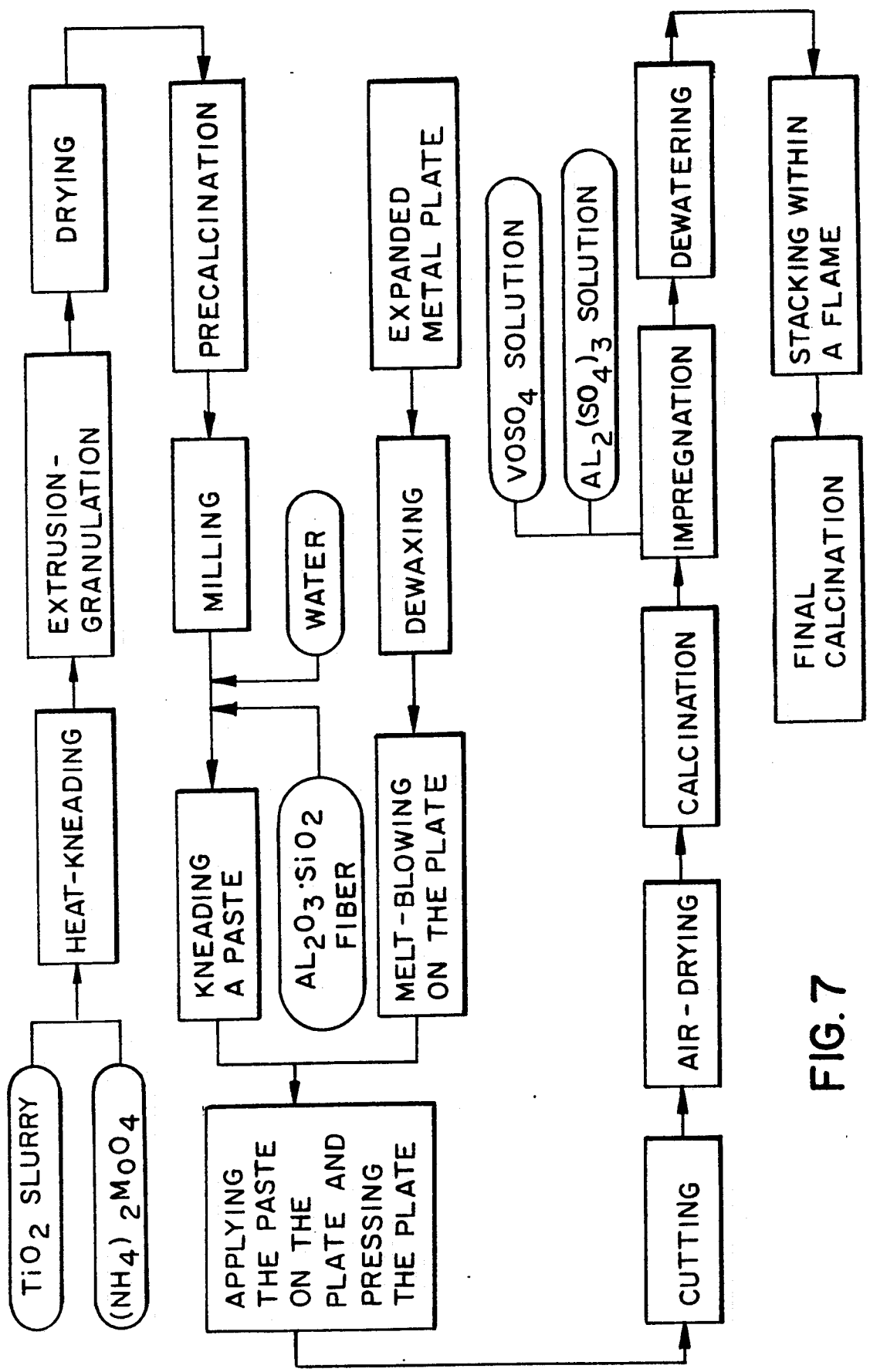
FIG. 7 shows a flow-chart directed to the preparation of one type of denitrating catalyst.

FIG. 7 discloses a flow diagram which sets forth the overall process followed in the preparation of the catalyst of the first type discussed above. A $TiO_2$ slurry is heat-kneaded, and $(NH_4)_2MoO_4$ is added. These steps are followed by extrusion-granulation, drying, precalcination, and milling. Thereafter, water is added, and aluminasilica fibers are added as a filler. The mixture is kneaded into a paste, and the paste is applied onto a substrate plate which is made of an expansible metal having a roughened surface. These substrate plates are pressed into a predetermined shape, cut and air dried. The resulting plate is calcined and then impregnated with $VoSO_4$ solution and $Al_2(SO_4)_3$ solution as other catalytic components. The plate is then dewatered and stacked within a frame body to form a catalyst unit. The catalyst unit is then subjected to final calcination. Of course, $(NH_4)_2MoO_4$ may be added at a later stage, for example, at the step of adding water and filler.

In the second type of catalyst, a molybdenum (Mo) component is replaced by a tungsten (W) component. This second type of catalyst has a superior heat resistance. In this case, ammonium paratungstate as a tungsten component, and ammonium metavanadate as a vanadium component, may be added at the step of adding water and filler without a step of impregnation.

It has been noted that since raw catalyst materials such as titanium, vanadium, molybdenum and tungsten are dissolved partially in a sulfuric acid to form a slurry containing their sulfates or a slurry including sulfuric acid, sulfate group is present in the resulting catalyst composition. The percentage denitration and mechanical properties of the catalyst are effected by the content of sulfate group ultimately remaining in the catalyst.

Figure 6:
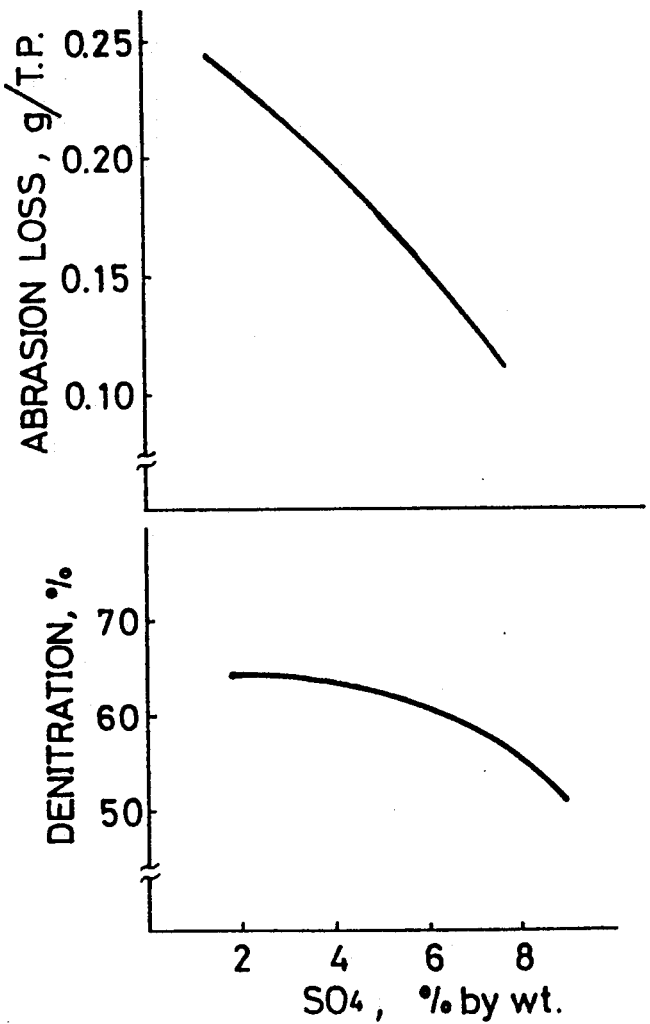
FIG. 6 illustrates the relationships between $SO_4$ content in the catalyst and a percentage denitration and an abrasion loss of the catalyst.

FIG. 6 shows a relationship between the quantity (by weight %) of $SO_4$ in the catalyst and the abrasion (or erosion) loss. It also shows the percentage denitration of the catalyst. As the content of $SO_4$ increases, the abrasion loss and the percentage denitration decreases. It is noted that there is an optimum range of the content of $SO_4$ in the catalyst in order to obtain a catalyst which satisfies both properties of denitration and abrasion resistance. In view of these facts, it is seen that a catalyst having a high quality and a uniform performance is obtained generally by adjusting the content of $SO_4$ group in the catalyst within a range of 4 to 7% by weight, preferably 5 to 6% by eight.

In the present invention, the relative passing directions of fresh hot air at the front part and at the rear part of a continuously moving reticulate belt is reversed midway through the calcination period. For example, the hot air is fed from downward to upward at the front part of the reticulate belt, and then contrarily from upward to downward at the rear part of the belt. The temperature of the catalyst units arranged on the belt is raised up to a definite level. The catalysts are then heat-treated, first by blowing fresh hot air fed from a first hot air-feeding means provided below the belt, through the inside of the catalyst layer from downward to upward. Midway during the calcination process, the catalyst unit moves with the movement of the belt to a position at which second hot air-feeding means are provided. At this point, the next process is carried out, i.e., the catalysts are heat-treated by fresh hot air blowing through the catalyst layer from upward to downward. In such a manner, as the belt moves continuously, the catalysts are almost uniformly calcined or heat-treated during the passage through the sections of the furnace wherein fresh hot air-feeding means are provided either above or below the belt.

In the case where hot air is passed through the catalyst units from only one side thereof, it flows always only in one direction. As a result, the calcination becomes non-uniform towards the flow direction of hot air. Even when hot air is passed only in one direction, catalyst calcination is possible, but the catalyst performance on the inlet side of hot air is different from that on the exit side thereof. In other words, there is high activity and low strength on the inlet side of hot air, while there is low activity and high strength on the exit side thereof. This is because the content of sulfate group in the catalyst relates to the performance on the catalyst. As the catalyst temperature on the upstream side of hot air rises, the sulfate group on the upstream side begins to fall off in advance and the sulfate group separated from the surface of the catalyst gradually flows towards the downstream side of hot air and adheres onto the downstream catalyst; hence there has been a tendency that the content of the remaining sulfate group on the upstream side of hot air is low, while that on the downstream side thereof is high to make the catalyst performance non-uniform.

In the present invention, the above-mentioned hot air should be fresh. If the used hot air is recycled, sulfate and sulfuric acid separated from the catalyst readheres to the catalyst. In such a case, the content of sulfate group in the catalyst on the inlet side of hot air increases to make the quality of the catalyst non-uniform. The preferred conditions of the hot air in the furnace for calcining the catalyst and at the same time adjust the content of sulfate group in the catalyst to a value within a preferable range are as follows:

a hot air temperature of 350° C. to 600° C., preferably 450° C. to 550° C.;

a hot air rate of 0.1 to 0.9 m/sec, preferably 0.3 to 0.5 m/sec; and, a retention time of the catalyst in the furnace of 1 to 4 hours, preferably 2 to 3 hours.

By selecting these conditions, the content of sulfate group in the catalyst is adjusted from an excess of 7% by weight to between about 4 to 7% by weight, preferably 5 to 6% by weight, based on the weight of the catalyst.

If the hot air temperature is too low or the hot air rate is too small, a long calcination temperature is required. On the other hand, it the hot air temperature is too high or the hot air rate is too large, cracks in the catalyst often occur.

The present invention will be described in greater detail by way of the following embodiments.

Figure 3:
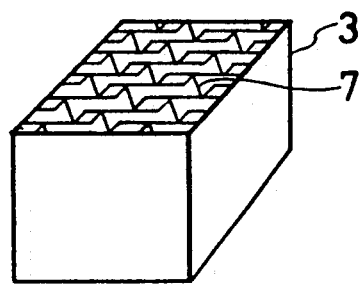
FIG. 3 shows an oblique view illustrating a denitration plate catalyst unit.

FIG. 1 shows an oblique view of a plate catalyst-calcining furnace illustrating an embodiment of the furnace used for the present invention. The plate catalyst units 3 arranged on a reticulate belt 4 are prepared by applying the denitrating catalyst onto a porous plate support having projections, stacking the resulting plate catalysts 7 by the medium of the projections, and encasing the resulting stacked plate catalysts in a frame body as shown in FIG. 3. The catalyst units 3 are arranged on the reticulate endless belt 4 which is suspended on a pair of rolls 6, so that the flow direction of fresh hot air can be upward and downward as shown in FIG. 1, and fresh hot air stream (1) which is divided into fresh hot air 1a, 1b, ... 1n is blown from downward to upward at the front part of the reticulate belt 4 advancing as shown by an arrow mark 5, whereby the temperature of the plate catalyst units 3 is elevated. The temperature is kept at this elevated level to calcine the units. Midway during the calcination, as the reticulate belt 4 moves, the catalyst units 3 move to a position where another fresh hot air stream 1', which is divided into 1a', 1b', 1c', is fed from above the catalyst units in a downward direction, with the temperature kept at a level to effect calcination. The catalyst units then are taken out after completion of the calcination. As to the loading manner and arrangement of the plate catalyst units 3, the units may be arranged so that hot air can be passed through the inside of the catalyst layer. In the above embodiment, fresh hot air is fed from downward to upward at the front part of the reticulate belt 4, while it is fed from upward to downward at the rear part thereof. By comparison, even when fresh hot air is fed from upward to downward at the front part while it is fed from downward to upward at the rear part, the same calcination effect is obtained. In FIG. 1, various pieces of equipment such as wall, ceiling, etc. are not shown. Actually, the flowing part of hot air is made so as to form a closed structure for temperature maintenance, and a flue for exhaust gas is provided.

Figure 2:
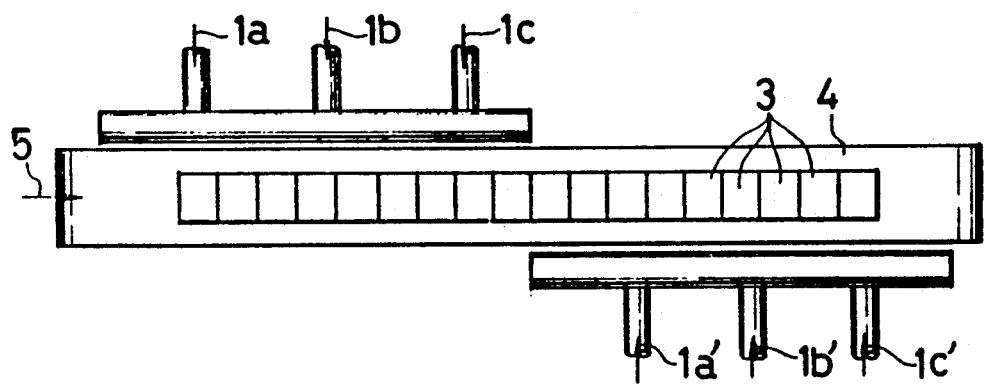
FIG. 2 shows a plan view illustrating another embodiment of the present invention.

FIG. 2 shows a plan view of another embodiment of a furnace employed in the present invention. Fresh hot air 1a, 1b, 1c is fed from the lateral side, and hot air 1a', 1b', 1c' is midway fed from the opposite lateral side, and it is possible to obtain plate catalysts having a uniform performance in both the length and width directions thereof.

In the above embodiments, description has been made referring to plate catalyst units, but the present invention is applicable to calcination of honeycomb catalyst units.

According to the above embodiments, by using fresh hot air and midway reversing the flow direction of the hot air, it is possible to uniformly carry out the catalyst calcination in the direction of gas flow path, make the content of sulfate group remaining in the catalysts suitable, and obtain catalysts having a uniform performance in a reasonable time.

Example

The catalyst composition consisting of titanium oxide, molybdenum oxide, vanadium oxide and alumina-silicate fibers was press-bonded onto an expanded metal plate to form a catalyst plate. The catalyst plate was then press-formed into a corrugated plate having Z-form projections in the cross-section. The resulting catalyst plates containing sulfate group in excess of 7% by weight were stacked within a frame body to form a catalyst unit having sizes of about 465×465×560 mm as shown in FIG. 3. The catalyst units were fed onto a reticulate belt 4 as shown in FIG. 1 to carry out calcination. The calcination conditions were as follows:

temperature of fresh hot air 1, 1': about 500° C.;

rate of fresh hot air passing through the catalyst units 3: about 0.4 m/sec; and retention time of the catalyst units within the furnace: about 2.5 hours.

As a result, denitrating catalyst units having a content of sulfate group in the catalysts of about 5.5% by weight and an extremely small dispersion of quality were obtained. Further, using the thus obtained catalyst, denitration of exhaust gas was carried out. As a result, the percentage denitration was as very good as 61% or higher, and the abrasion loss of the catalyst was also small as 0.16 g/test piece (100×100 mm).

Comparative Example

Figure 4:
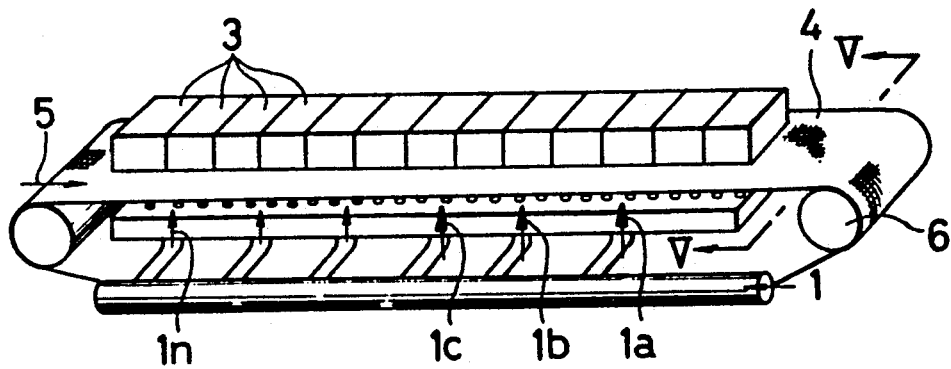
FIG. 4 shows an oblique view illustrating a catalyst-calcining furnace in comparison with the present invention.
Figure 5:
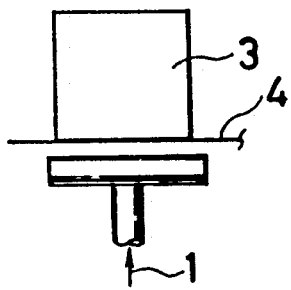
FIG. 5 shows a view from an arrow mark along the direction line of V—V in FIG. 4.

Calcination of the same catalyst units as in the above Example is carried out at the same conditions except that fresh hot air is fed so that the passing direction of the air is all the same along the moving direction of the reticulate belt as shown in FIG. 4.

As a result, denitrating catalyst units having a content of sulfate group in the catalyst scattering from about 3 to 8% by weight, and a non-uniform quality, were obtained. Further, using the thus obtained catalyst, denitration of exhaust gas was carried out. As a result, the percentage denitration was 55 to 63%, and abrasion loss of the catalyst was scattered from 0.12 to 0.25 g/test piece (100×100 mm).

In the above comparative example, when used hot air was recycled instead of using fresh hot air, a retention time of about ten hours was necessary in order to obtain a catalyst having the same quality as in the first example.

According to the present invention, it is possible to obtain a calcined catalyst having excellent properties such as high percentage denitration, high abrasion resistance, etc. and an efficient process for calcining catalyst having a short time for calcination, a good catalyst efficiency at the time of catalyst calcination etc.

Although the invention has been shown and described with respect to preferred embodiments, it is obvious that modifications and alterations will occur to others upon a reading and understanding of this specification. It is intended to include all such modifications and alterations insofar as they come within the scope of the claims or the equivalents thereof.

What is claimed is:

1. A process for calcining a sulfate containing denitrating catalyst used in exhaust gas denitration to uniformly reduce the sulfate content therein to a predetermined level, the process comprising the steps of:

arranging a plurality of catalyst units on a reticulate belt in a calcining furnace, the catalyst units formed subsequent to mixing oxides of metals including Ti, W and/or Mo and V in sulfuric acid, wherein the resulting catalysts include sulfate in excess of 7% by weight;

continuously moving the reticulate belt within the furnace;

flowing fresh hot air at a temperature in the range of about 350° C. to 600° C. through the denitrating catalyst units in a first hot air direction at a rate of about 0.1 to 0.9 m/sec to separate the sulfate from the catalyst units, resulting in first sulfate-contaminated air;

exhausting the first sulfate-contaminated air from the furnace;

flowing fresh hot air through the denitrating catalyst units in a second direction directly opposite the first hot air direction to pass fresh hot air at a temperature in the range of about 350° C. to 600° C. through the catalyst units in a second direction at a rate of about 0.1 to 0.9 m/sec to separate sulfate from the catalyst units, resulting in second sulfate-contaminated air;

exhausting the second sulfate-contaminated air from the furnace; and controlling the rate of hot air flow in the first and second directions so that the content of sulfate group is uniformly reduced to about 4 to 7 percent by weight of the catalyst.

2. The process of claim 1 wherein the sulfate group is present in the denitrating catalyst in the form of a metal sulfate.

3. The process of claim 1 wherein the sulfate group present in the denitrating catalyst is adsorbed on a metal oxide.

4. The process of claim 1 wherein the sulfate group content is reduced to about 5-6% by weight of the catalyst.

5. The process of claim 1 wherein said hot air is fed so that the passing direction of said hot air can be reversed from downward to upward or from upward to downward at the front part and the rear part of said reticulate belt.

6. The process of claim 1 wherein the temperature of said hot air is in the range of about 450° C. to 550° C.

7. The process of claim 1 wherein the retention time of said denitrating catalyst units passing through said furnace is in the range of about 1 to 4 hours.

8. The process of claim 7 wherein the retention time of said denitrating catalyst units passing through said furnace is in the range of about 2 to 3 hours.

9. The process of claim 1 wherein the hot air rate is in the range of about 0.3 to 0.5 m/sec.

10. The process of claim 1 wherein the denitrating catalyst includes at least one member selected from the group consisting of titanium, vanadium, molybdenum and tungsten.

11. The process of claim 1 wherein the denitrating catalyst units are comprised of:
a plurality of plate catalysts arranged in a stack, each plate catalyst including a porous plate support coated with a layer of denitrating catalyst; and,
a frame body for encasing the stacked plate catalysts.

* * * * *